United States Patent

Kulkarni et al.

Patent Number: 6,159,411
Date of Patent: *Dec. 12, 2000

[54] RAPID PROTOTYPING METHOD AND APPARATUS WITH SIMPLIFIED BUILD PREPARATION FOR PRODUCTION OF THREE DIMENSIONAL OBJECTS

[75] Inventors: Rajeev B. Kulkarni, Burbank; Chris R. Manners, Moorpark, both of Calif.

[73] Assignee: 3D Systems, Inc., Valencia, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/247,119

[22] Filed: Feb. 8, 1999

[51] Int. Cl.$^7$ .............................. B29C 35/08; B29C 41/02
[52] U.S. Cl. ..................... 264/401; 425/174.4; 425/375; 700/120
[58] Field of Search ..................................... 264/308, 401; 425/174.4, 375; 700/120

[56] References Cited

U.S. PATENT DOCUMENTS

| | | |
|---|---|---|
| 4,575,330 | 3/1986 | Hull . |
| 4,752,352 | 6/1988 | Feygin . |
| 4,863,538 | 9/1989 | Deckard . |
| 4,999,143 | 3/1991 | Hull et al. . |
| 5,015,312 | 5/1991 | Kinzie . |
| 5,058,988 | 10/1991 | Spence . |
| 5,059,021 | 10/1991 | Spence et al. . |
| 5,076,974 | 12/1991 | Modrek et al. . |
| 5,104,592 | 4/1992 | Hull et al. . |
| 5,121,329 | 6/1992 | Crump . |
| 5,123,734 | 6/1992 | Spence et al. . |
| 5,133,987 | 7/1992 | Spence et al. . |

(List continued on next page.)

FOREIGN PATENT DOCUMENTS

| | | |
|---|---|---|
| WO 95/18009 | 7/1995 | WIPO . |
| WO 95/29053 | 11/1995 | WIPO . |
| WO 96/12607 | 5/1996 | WIPO . |
| WO 96/12608 | 5/1996 | WIPO . |
| WO 96/12609 | 5/1996 | WIPO . |
| WO 96/12610 | 5/1996 | WIPO . |
| WO 97/11835 | 4/1997 | WIPO . |
| WO 97/11837 | 4/1997 | WIPO . |
| WO 98/51479 | 11/1998 | WIPO . |

OTHER PUBLICATIONS

Jacobs, "Rapid Prototyping & Manufacturing: Fundamentals of StereoLithography," Society of Manufacturing Engineers, 1992.

Jacobs, "Stereolithography and other RP&M Technologies," Society of Manufacturing Engineers, 1996.

(List continued on next page.)

Primary Examiner—Leo B. Tentoni
Attorney, Agent, or Firm—Dennis R. Smalley; Ralph D'Alessandro

[57] ABSTRACT

A rapid prototyping and manufacturing (e.g. stereolithography) method and apparatus for making three-dimensional objects with simplified correlation of building parameters with object data. Object data is preferably correlated to (1) object build parameters that are used in solidifying object portions of layers of the material, (2) recoating parameters that are used in forming layers of material that include object data, (3) support build parameters that are used in solidifying support portions of layers of the material, (4) recoating parameters that are used in forming layers of material that include support data but no object data, and (5) parameters for use in generating a support structure that will be used to support the object during its formation. A style file is identified with each set of parameters. An algorithm (i.e. style wizard) is used to select among a plurality of styles of each type. The algorithm derives successively narrowing groups of compatible styles, for a particular build, based on answers to a series of questions until a final singular group of compatible styles is identified. This final group of styles is used in the formation of the object. This process results in fewer errors in deriving groups of styles and increases the probability of successful build processes.

23 Claims, 11 Drawing Sheets

U.S. PATENT DOCUMENTS

| | | |
|---|---|---|
| 5,141,680 | 8/1992 | Almquist et al. . |
| 5,143,663 | 9/1992 | Leyden et al. . |
| 5,174,931 | 12/1992 | Almquist et al. . |
| 5,182,056 | 1/1993 | Spence et al. . |
| 5,182,715 | 1/1993 | Vorgitch et al. . |
| 5,184,307 | 2/1993 | Hull et al. . |
| 5,192,469 | 3/1993 | Hull et al. . |
| 5,204,055 | 4/1993 | Sachs et al. . |
| 5,209,878 | 5/1993 | Smalley et al. . |
| 5,234,636 | 8/1993 | Hull et al. . |
| 5,238,639 | 8/1993 | Vinson et al. . |
| 5,256,340 | 10/1993 | Allison et al. . |
| 5,321,622 | 6/1994 | Snead et al. . |
| 5,597,520 | 1/1997 | Smalley et al. . |
| 5,840,239 | 11/1998 | Partanen et al. . |
| 5,855,718 | 1/1999 | Nguyen et al. . |
| 5,902,537 | 5/1999 | Almquist et al. . |
| 5,902,538 | 5/1999 | Kruger et al. . |
| 5,943,235 | 8/1999 | Earl et al. . |
| 5,945,058 | 8/1999 | Manners et al. . |
| 5,965,079 | 10/1999 | Manners ................... 264/401 |
| 6,001,297 | 12/1999 | Partanen et al. . |

OTHER PUBLICATIONS

U.S. Patent Application No. 08/855,125, filed May 13, 1997 by Nguyen, et al.

U.S. Patent Application No. 09/061,796, filed Apr. 16, 1998 by Wu et al.

U.S. Patent Application No. 09/154,967, filed Sep. 17, 1998 by Nguyen et al.

U.S. Patent Application No. 09/246,416, filed Feb. 8, 1999 by Bishop et al.

U.S. Patent Application No. 09/246,504, filed Feb. 8, 1999 by Guertin et al.

U.S. Patent Application No. 09/247,113, filed Feb. 8, 1999 by Chari et al.

U.S. Patent Application No. 09/247,114, filed Feb. 8, 1999 by Beers.

U.S. Patent Application No. 09/247,119, filed Feb. 8, 1999 by Kulkarni et al.

U.S. Patent Application No. 09/247,120, filed Feb. 8, 1999 by Everett et al.

U.S. Patent Application No. 09/248,351, filed Feb. 8, 1999 by Manners et al.

U.S. Patent Application No. 09/248,352, filed Feb. 8, 1999 by Manners et al.

U.S. Patent Application No. 09/248,353, filed Feb. 8, 1999 by Kerekes.

U.S. Patent Application No. 09/484,984, filed Jan. 18, 2000 by Earl et al.

FIG. 2A

[SLA190-NONE]
SL5170=

[SLA250-REGULAR]
SL5149=
SL5170=
SL5220=

[SLA250-ZEPHYR]
SL5170=
SL5220=
SL5210=

[SLA350-ZEPHYR]
SL5190=
SL5510=
SL5520=
SL5530=

[SLA3500-ZEPHYR]
SL5190=
SL5510=
SL5520=
SL5530=

[SLA500-REGULAR]
SL5180=
SL5410=
SL5154=

[SLA500-ZEPHYR]
SL5180=
SL5410=

[SLA5000-ZEPHYR]
SL5195=
SL5510=
SL5520=
SL5530=

[SLA7000-ZEPHYR]
SL7510=

[BuildStyles]
T=
F=
X=
H=
B=
Q=

FIG. 2B

[Features]
V=
L=
I=
D=
G=

[Thickness-in]
0010=
0020=
0030=
0025=
0040=
0050=
0060=
0080=
0100=

[Thickness-mm]
0250=
0750=
0500=
0625=
1000=
1250=
1500=
2000=
2500=

[Resins]
SL5170=
SL5149=
SL5220=
SL5210=
SL5190=
SL5510=
SL5520=
SL5154=
SL5180=
SL5410=
SL5195=
SL5530=
SL7510=

FIG. 2C

[SLA190-N-SL5170]
p5170bng0060=
p5170fng0080=
p5170xng0060=

[SLA250-R-SL5149]
p5149frg0050=
p5149frg0100=

[SLA250-R-SL5170]
p5170brg0060=
p5170xrg0060=

[SLA250-R-SL5220]
p5220hrg0060=
p5220frg0060=
p5220fri0060=
p5220xrg0060=
p5220xri0060=

[SLA250-Z-SL5170]
p5170bzg0040=
p5170bzg0060=
p5170hzg0060=
p5170xzg0040=
p5170xzg0060=

[SLA250-Z-SL5210]
p5210fzg0040=
p5210fzg0060=
p5210xzg0040=

[SLA250-Z-SL5220]
p5220hzg0040=
p5220hzg0040=
p5220xzg0040=
p5220xzi0040=
p5220xzg0040=
p5220fzg0060=
p5220fzi0060=
p5220fzg0060=

[SLA250-Z-SL5170]
p5170fzg0025=

FIG. 2D

```
[SLA350-Z-SL5190]
p5190bzg0040=
p5190fzg0050=
p5190fzg0050=
p5190xzg0040=
p5190xzg0040=
p5190tzg0020=

[SLA350-Z-SL5510]
p5510hzg0040=
p5510fzg0040=
p5510fzg0050=
p5510xzg0040=
p5510xzg0060=
p5510tzg0020=

[SLA350-Z-SL5520]
p5520fzg0050=
p5520fzg0050=
p5520xzg0040=
p5520xzg0040=

[SLA350-Z-SL5530]
p5530xzg0040=
p5530tzg0020=

[SLA3500-Z-SL5190]
p5190bzg0040=
p5190fzg0050=
p5190fzg0050=
p5190xzg0040=
p5190xzg0040=
p5190tzg0020=

[SLA3500-Z-SL5510]
p5510hzg0040=
p5510fzg0040=
p5510fzg0050=
p5510xzg0040=
p5510xzg0060=
p5510tzg0020=

[SLA3500-Z-SL5520]
p5520fzg0050=
p5520fzg0050=
p5520xzg0040=
p5520xzg0040=

[SLA3500-Z-SL5530]
p5530xzg0040=
p5530tzg0020=
```

FIG. 2E

[SLA500-R-SL5154]
p5154frg0050=
p5154frg0100=

[SLA500-R-SL5180]
p5180brg0060=
p5180xrg0060=

[SLA500-R-SL5410]
p5410brg0060=
p5410hrg0060=
p5410xrg0060=

[SLA500-Z-SL5180]
p5180bzg0040=
p5180bzg0060=
p5180hzg0060=
p5180xzg0040=
p5180xzg0040=
p5180xzg0060=
p5180xzg0060=

[SLA500-Z-SL5410]
p5410bzg0060=
p5410hzg0060=
p5410xzg0060=

[SLA5000-Z-SL5195]
p5195hzg0040=
p5195fzg0050=
p5195xzg0040=
p5195xzg0060=
p5195tzg0020=

[SLA5000-Z-SL5510]
p5510hzg0040=
p5510fzg0050=
p5510fzi0050=
p5510xzg0040=
p5510xzi0040=
p5510tzg0020=

[SLA5000-Z-SL5520]
p5520fzg0050=
p5520xzg0040=
p5520xzi0040=

[SLA5000-Z-SL5530]
p5530xzg0040=
p5530tzg0020=

[SLA7000-Z-SL7510]
p7510xzg0030=
p7510tzg0010=
p7510hzg0040=

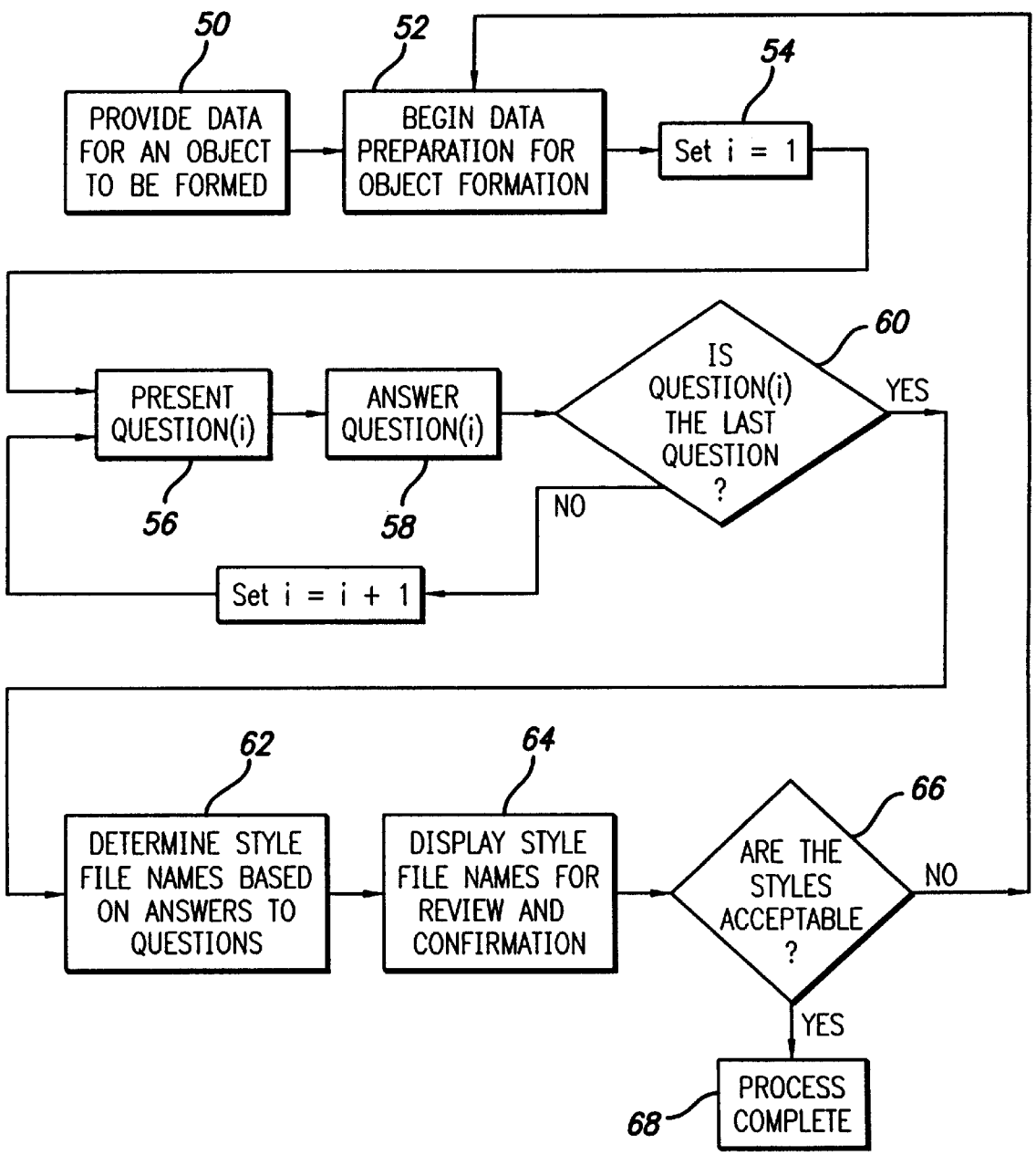

RAPID PROTOTYPING METHOD AND APPARATUS WITH SIMPLIFIED BUILD PREPARATION FOR PRODUCTION OF THREE DIMENSIONAL OBJECTS

FIELD OF THE INVENTION

This invention relates to the formation of three-dimensional objects using a Rapid Prototyping and Manufacturing (RP&M) technique (e.g. stereolithography). The invention more particularly relates to simplified techniques for handling data preparation for forming those three-dimensional objects.

BACKGROUND OF THE INVENTION

1. Related Art

Rapid Prototyping and Manufacturing (RP&M) is the name given to a field of technologies that can be used to form three-dimensional objects rapidly and automatically from three-dimensional computer data representing the objects. Rapid Prototyping and Manufacturing can be considered to include three classes of technologies: (1) stereolithography, (2) selective deposition modeling, and (3) laminated object manufacturing.

The stereolithography class of technologies creates three-dimensional objects by successively forming layers of a fluid-like medium adjacent to previously formed layers of medium and selectively solidifying these layers to form and adhere laminae (i.e. solidified layers). These laminae are solidified according to cross-sectional data representing successive slices of the three-dimensional object. Typically, adhesion between successive laminae occurs by chemical bond formation between the two laminae (e.g. inter-lamina cross-linking) during polymerization. In alternative embodiments, it is possible that adhesion could occur by application of a separate adhesive or by other mechanical bonding. In summary, adhesion may occur via an adhesive or cohesive phenomenon.

One specific stereolithography technology is known simply as stereolithography, and uses a liquid medium building material that is selectively solidified by exposing it to stimulation. The liquid medium is typically a photopolymerizable material (i.e. resin) and the stimulation is typically visible or ultraviolet electromagnetic radiation. The radiation is typically produced by a laser. Liquid-based stereolithography is disclosed in various patents, applications, and publications, of which a number are briefly described in the Related Patents, Applications and Publications section hereafter. Another stereolithography technology is known as selective laser sintering (SLS). Selective laser sintering is based on the selective solidification of layers of a powdered medium by exposing the layers to infrared electromagnetic radiation to sinter or fuse the particles. Selective laser sintering is described in U.S. Pat. No. 4,863,538 issued Sep. 5, 1989, to Deckard. A third technology is known as Three Dimensional Printing (3DP). Three-dimensional printing is based on the selective solidification of layers of a powdered medium which are solidified by the selective deposition of a binder thereon. Three-dimensional printing is described in U.S. Pat. No. 5,204,055 issued Apr. 20, 1993, to Sachs, et al.

The present invention is primarily directed to stereolithography using liquid-based building materials (i.e. medium). It is believed, however, that the techniques of the present invention may have application in the other stereolithography technologies for the purposes of simplifying data preparation, reducing error during preparation, and/or speeding the overall process of object formation.

Selective deposition modeling, SDM, involves the build-up of three-dimensional objects by selectively depositing solidifiable material on a lamina-by-lamina basis according to cross-sectional data representing slices of the three-dimensional object. One such technique is called fused deposition modeling, FDM, and involves the extrusion of streams of heated, flowable material which solidify as they are dispensed onto the previously formed laminae of the object. Fused deposition modeling is described in U.S. Pat. No. 5,121,329 issued Jun. 9, 1992, to Crump. Another technique is called Ballistic Particle Manufacturing, BPM, which uses a 5-axis, ink-jet dispenser to direct particles of a material onto previously solidified layers of the object. Ballistic particle manufacturing is described in PCT Publication Nos. WO 96/12607 published May 2, 1996, by Brown, et al.; WO 96/12608 published May 2, 1996, by Brown et al.; WO 96/12609 published May 2, 1996, by Menhennett et al.; and WO 96/12610 published May 2, 1996, by Menhennett et al. A third technique called Multijet Modeling (MJM) involves the selective deposition of droplets of material from multiple ink jet orifices to speed the building process. Multijet modeling is described in PCT Publication Nos. WO 97/11835 published Apr. 3,1997, by Earl et al.; and, WO 97/11837 published Apr. 3, 1997, by Leyden et al. (both assigned to 3D Systems, Inc., as is the instant application).

Though, as noted above, the techniques of the instant invention are directed primarily to liquid-based stereolithography object formation, it is believed that the techniques may have application in the selective deposition modeling technologies to simplify data preparation, reduce errors during preparation, and/or speed the overall process of object formation.

Laminated object manufacturing, LOM, techniques involve the formation of three-dimensional objects by the stacking, adhering, and selective cutting, in a selected order, of sheets of material according to the cross-sectional data representing the three-dimensional object to be formed. Laminated object manufacturing is described in U.S. Pat. No. 4,752,352 issued Jun. 21, 1988, to Feygin; and U.S. Pat. No. 5,015,312 issued May 14, 1991, to Kinzie; and in PCT Publication WO 95/18009 published Jul. 6,1995, by Morita et al.

It is believed that the techniques may have application in the laminated object manufacturing technologies to simplify data preparation, reduce errors during preparation, and/or speed the overall process of object formation.

A need exists in the art for simplified data preparation techniques that reduce chances of human error and/or speed the preparation of object data.

2. Other Related Patents, Applications and Publications

The patents, applications and publications mentioned above and hereafter are all incorporated by reference herein as if set forth in full. Table 1 provides a table of patents, applications and publications co-owned by the assignee of the instant application. A brief description of subject matter found in each patent, application and publication is included in the table to aid the reader in finding specific types of teachings. It is not intended that the incorporation of subject matter be limited to those topics specifically indicated, but instead the incorporation is to include all subject matter found in these publications, applications and patents. The teachings in these incorporated references can be combined with the teachings of the instant application in many ways. For example, the references directed to various data manipulation techniques may be combined with the teachings herein to derive even more useful data that can be used to more accurately, more automatically, and/or efficiently form objects. As another example, the various apparatus configurations disclosed in these references may be used in conjunction with the novel features of the instant invention.

TABLE 1

Related Patent and Applications

| Patent No. Application No. | Inventor | Subject |
|---|---|---|
| U.S. 4,575,330 | Hull | Discloses fundamental elements of stereolithography. |
| U.S. 4,999,143 | Hull, et al. | Discloses various removable support structures applicable to stereolithography. |
| U.S. 5,058,988 | Spence | Discloses the application of beam profiling techniques useful in stereolithography for determining cure depth and scanning velocity, etc. |
| U.S. 5,059,021 | Spence, et al. | Discloses the utilization of drift correction techniques for eliminating errors in beam positioning resulting from instabilities in the beam scanning system |
| U.S. 5,076,974 | Modrek, et al. | Discloses techniques for post processing objects formed by stereolithography. In particular exposure techniques are described that complete the solidification of the building material. Other post processing steps are also disclosed such as steps of filling in or sanding off surface discontinuities. |
| U.S. 5,104,592 | Hull | Discloses various techniques for reducing distortion, and particularly curl type distortion, in objects being formed by stereolithography. |
| U.S. 5,123,734 | Spence, et al. | Discloses techniques for calibrating a scanning system. In particular techniques for mapping from rotational mirror coordinates to planar target surface coordinates are disclosed |
| U.S. 5,133,987 | Spence, et al. | Discloses the use of a stationary mirror located on an optical path between the scanning mirrors and the target surface to fold the optical path in a stereolithography system. |
| U.S. 5,141,680 | Almquist, et al. | Discloses various techniques for selectively dispensing a material to build up three-dimensional objects. |
| U.S. 5,143,663 | Leyden, et al. | Discloses a combined stereolithography system for building and cleaning objects. |
| U.S. 5,174,931 | Almquist, et al. | Discloses various doctor blade configurations for use in forming coatings of medium adjacent to previously solidified laminae. |
| U.S. 5,182,056 | Spence, et al. | Discloses the use of multiple wavelengths in the exposure of a stereolithographic medium. |
| U.S. 5,182,715 | Vorgitch, et al. | Discloses various elements of a large stereolithographic system. |
| U.S. 5,184,307 from app. no. 07/331,644 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| U.S. 5,192,469 | Hull, et al. | Disclosed various techniques for forming three-dimensional objects from sheet material by selectively cutting out and adhering laminae. |
| U.S. 5,209,878 | Smalley, et al. | Discloses various techniques for reducing surface discontinuities between successive cross-sections resulting from a layer-by-layer building technique. Disclosed techniques include use of fill layers and meniscus smoothing. |
| U.S. 5,234,636 | Hull, et al. | Discloses techniques for reducing surface discontinuities by coating a formed object with a material, heating the material to cause it to become flowable, and allowing surface tension to smooth the coating over the object surface. |
| U.S. 5,238,639 | Vinson, et al. | Discloses a technique for minimizing curl distortion by balancing upward curl to downward curl. |
| U.S. 5,256,340 and WO 95/29053 | Allison, et al. | Discloses various build/exposure styles for forming objects including various techniques for reducing object distortion. Disclosed techniques include: (1) building hollow, partially hollow, and solid objects, (2) achieving more uniform cure depth, (3) exposing layers as a series of separated tiles or bullets, (4) using alternate sequencing exposure patterns from layer to layer, (5) using staggered or offset vectors from layer to layer, and (6) using one or more overlapping exposure patterns per layer. |
| U.S. 5,321,622 | Snead, et al. | Discloses a computer program known as CSlice which is used to convert three-dimensional object data into cross-sectional data. Disclosed techniques include the use of various Boolean operations in stereolithography. |
| U.S. 5,597,520 and WO 95/29053 | Smalley, et al. | Discloses various exposure techniques for enhancing object formation accuracy. Disclosed techniques address formation of high resolution objects from building materials that have a |

TABLE 1-continued

Related Patent and Applications

| Patent No. Application No. | Inventor | Subject |
| --- | --- | --- |
| | | Minimum Solidification Depth greater than one layer thickness and/or a Minimum Recoating Depth greater than the desired object resolution. |
| WO 97/11835 | Thayer, et al. | Discloses build and support styles for use in a Multi-Jet Modeling selective deposition modeling system. |
| WO 97/11837 | Earl, et al. | Discloses data manipulation and system control techniques for use in a Multi-Jet Modeling selective deposition modeling system. |
| US 5,902,537 | Almquist, et al. | Discloses various recoating techniques for use in stereolithography. Disclosed techniques include 1) an ink jet dispensing device, 2) a fling recoater, 3) a vacuum applicator, 4) a stream recoater, 5) a counter rotating roller recoater, and 6) a technique for deriving sweep extents. |
| U.S. 5,840,239 | Partanen, et al. | Discloses the application of solid-state lasers to stereolithography. |
| U.S. 5,840,239 | Partanen, et al. | Discloses the use of a pulsed radiation source for solidifying layers of building material and in particular the ability to limit pulse firing locations to only selected target locations on a surface of the medium. |
| U.S. 6,001,297 | Partanen, et al. | Discloses the formation of objects using a pulsed radiation source where pulsing occurs at selected positions on the surface of a building material. |
| U.S. 08/855,125 | Nguyen, et al. | Discloses techniques for interpolating originally supplied sectional data descriptive of a three-dimensional object to produce modified data descriptive of the three-dimensional object including data descriptive of intermediate regions between the originally supplied cross-sections of data. |
| WO 98/51479 | Manners, et al. | Discloses techniques for identifying features of partially formed objects. Identifiable features include trapped volumes, effective trapped volumes, and solid features of a specified size. The identified regions can be used in automatically specifying recoating parameters and or exposure parameters. |
| U.S. 5,902,538 | Kruger, et al. | Discloses simplified techniques for making high resolution objects utilizing low resolution materials which are limited by their inability to reliably form coatings of a desired thickness due to a Minimum Recoating Depth (MRD) limitation. Data manipulation techniques define layers as primary or secondary. Recoating techniques are described which can be used when the thickness between consecutive layers is less than a leading edge bulge phenomena. |
| U.S. 09/061,796 | Wu, et al. | Discloses use of frequency converted solid state lasers in stereolithography. |
| U.S. 09/154,967 | Nguyen, et al. | Discloses techniques for stereolithographic recoating using sweeping recoating device that pause and/or slows down over laminae that are being coated over. |
| U.S. 09/246,504 | Guertin, et al. | Discloses techniques for forming objects wherein a delay is made to occur between successive exposures of a selected region of a layer. |
| U.S. 09/248,352 | Manners, et al. | Discloses stereolithographic techniques for forming objects using multiple sized beams including data manipulation techniques for determining which portions of lamina may be formed with a larger beam and which should be formed using a smaller beam. |
| 09/248,351 | Nguyen, et al. | Discloses improved techniques for managing recoating parameters when forming objects using layer thicknesses smaller than a minimum recoating depth (MRD) and treating some non-consecutive layers as primary layers and treating intermediate layers there between as secondary layers. |
| 09/246,416 | Bishop, et al. | Discloses an improved Stereolithographic apparatus structure for isolating vibration and/or extraneous heat producing components from other thermal and vibration sensitive components. |
| 09/484,984 | Earl, et al. | Discloses techniques for forming objects while compensating for solidification width induced in a building material by a beam of prescirbed stimulation. |
| 09/247,214 | Beers, et al. | Discloses improved stereolithographic techniques for ensuring scan speeds and laser power settings are appropriate for accurately and rapidly exposing layers of material. |
| 09/247113 | Chari, et al. | Disclosed improved stereolithographic techniques for maintaining build chamber temperature at a desired level. The difference between a detected temperature and the desired temperature. |
| 09/247,120 | Everett, et al. | Discloses techniques forming objects using varying production of prescribed stimulation (e.g. UV radiation). Production is |

TABLE 1-continued

Related Patent and Applications

| Patent No. Application No. | Inventor | Subject |
|---|---|---|
| | | reduced or eliminated during non-exposure periods (e.g. recoating, z-wait, and pre-dip delay). Production is set to a desired level based on the type of exposure that is desired. |
| 09/248,353 | Beers, et al. | Discloses techniques for forming objects by exposing a material to a beam of prescribed stimulation while accurately controlling exposure and positioning of the beam when under the control of vector data and when high speed scanning is desired. |

The following two books are also incorporated by reference herein as if set forth in full: (1) *Rapid Prototyping and Manufacturing: Fundamentals of Stereolithography*, by Paul F. Jacobs; published by the Society of Manufacturing Engineers, Dearborn Mich.; 1992; and (2) *Stereolithography and other RP&M Technologies: from Rapid Prototyping to Rapid Tooling;* by Paul F. Jacobs; published by the *Society of Manufacturing Engineers,* Dearborn Mich.; 1996.

SUMMARY OF THE INVENTION

A first aspect of the invention is to provide a method of forming a three-dimensional object from a plurality of laminae by exposing successive layers of a material to prescribed stimulation, including (1) providing data representing an object to be formed; (2) providing answers to a series of questions; (3) automatically determining a group of styles to be used in forming the object, wherein the determination is derived based on the answers provided; (4) forming a layer of material according to at least one of the styles of the group, wherein the layer is formed in preparation for forming a successive lamina of the object; (5) exposing the material to the prescribed stimulation to form a successive lamina of the object, wherein the exposure is performed according to at least one of the styles of the group; and (6) repeating the acts of forming and exposing a plurality of times in order to form the object from a plurality laminae.

A second aspect of the invention is to provide an apparatus for forming a three-dimensional object from a plurality of adhered laminae by exposing successive layers of a material to prescribed stimulation, including (1) a memory for receiving data representing an object; (2) a memory for receiving answers to a series of questions; (3) a computer programmed to automatically determine a group of styles to be used in forming the object based on the answers provided; (4) a coating system for forming a layer of material, according to a style forming part of the group, adjacent to any last formed layer of material in preparation for forming a subsequent lamina of the object; (5) an exposure system for selectively applying prescribed stimulation to the layer, according to the object data and a style forming part of the group, to form a successive lamina of the object; and (6) a control computer programmed to operate the coating system and the exposure system in order to form the object from a plurality of adhered laminae.

A third aspect of the invention is to provide an apparatus for forming a three-dimensional object from a plurality of adhered laminae by exposing successive layers of a material to prescribed stimulation, including (1) means for receiving data representing an object; (2) means for receiving answers to a series of questions; (3) means for automatically determining a group of styles to be used in forming the object based on the answers provided; (4) means for forming a layer of material, according to a style forming part of the group, adjacent to any last formed layer of material in preparation for forming a subsequent lamina of the object; (5) means for selectively applying prescribed stimulation to the layer, according to the object data and a style forming part of the group, to form a successive lamina of the object; and (6) means for repeating the acts of forming and for selectively applying prescribed stimulation in order to form the object from a plurality of adhered laminae.

Additional aspects of the invention will be clear from the embodiment of the invention described below in conjunction with the Figures associated therewith. The above noted aspects, as well as other aspects ascertainable from the specification, may be practiced separately or in combination.

BRIEF DESCRIPTION OF THE DRAWINGS

FIG. 2*a*–2*e* depict the StyleWizardin.ini file for practicing a preferred embodiment of the invention.

FIG. 3 is a flow chart depicting a preferred embodiment of the invention.

FIG. 5 is a graphical illustration of a computer window screen depicting the stereolithographic machine and resin being employed.

FIG. 6 is a graphical illustration of a computer window screen depicting the units selected.

FIG. 7 is a graphical illustration of a computer window screen depicting the build style selected.

FIG. 8 is a graphical illustration of a computer window screen depicting the lamina layer thickness selected.

FIG. 9 is a graphical illustration of a computer window screen depicting the choices made by a user.

DESCRIPTION OF PREFERRED EMBODIMENT OF THE INVENTION

Figure 1A:
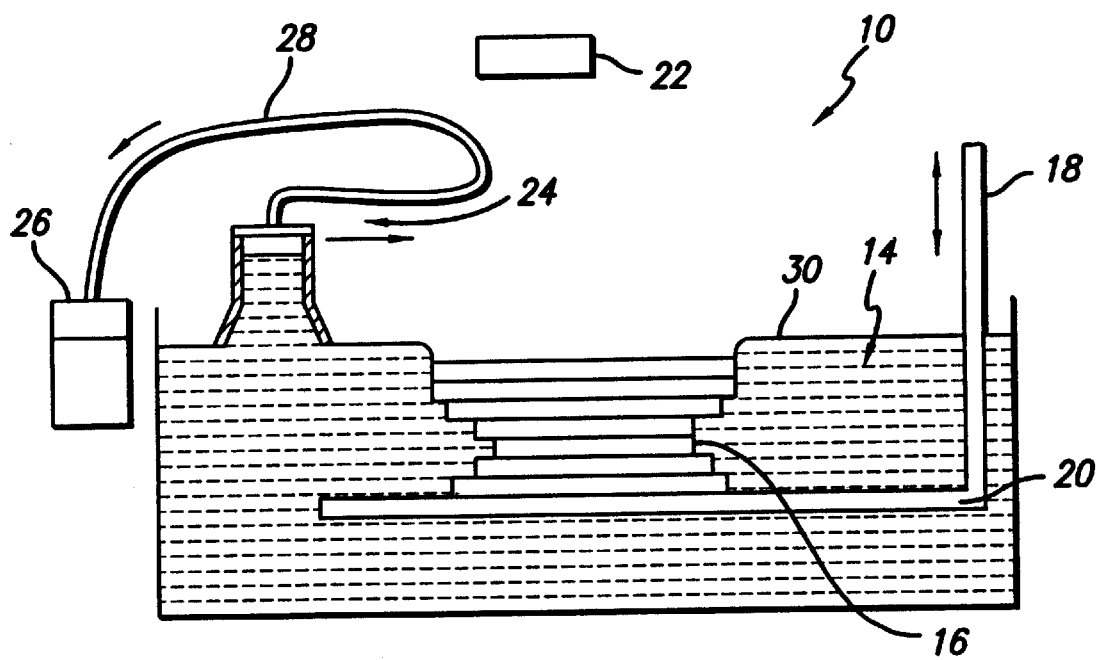
FIG. 1*a* and 1*b* depict side views of a stereolithography apparatus for practicing the instant invention.
Figure 1B:
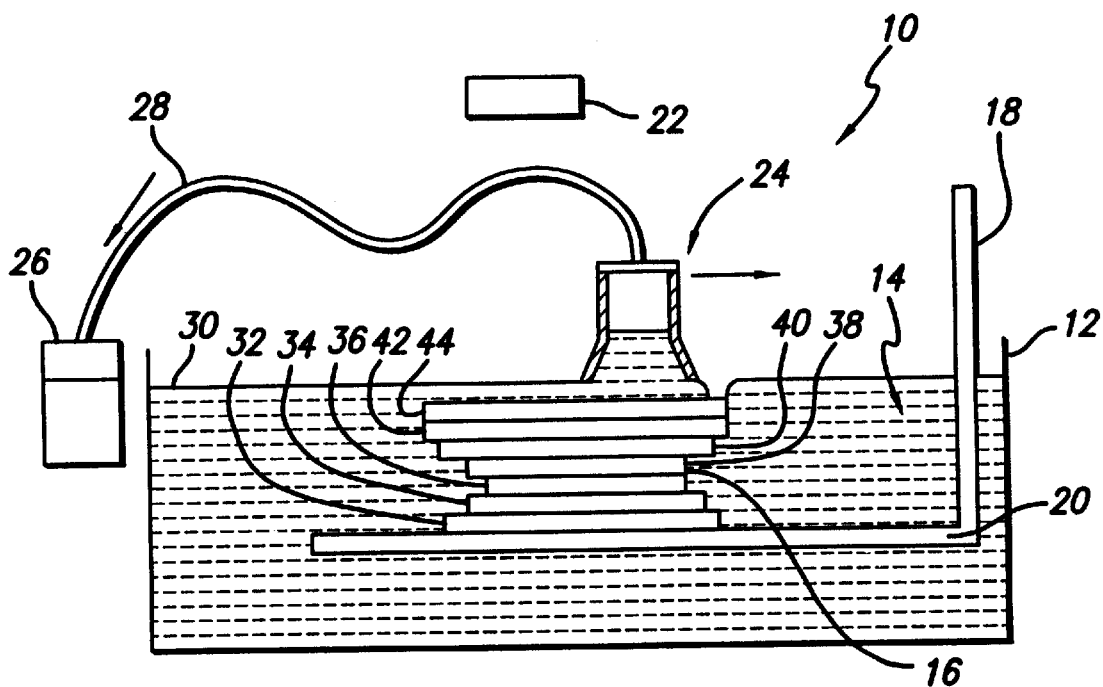

FIGS. 1*a* and 1*b* depict schematic representations of a preferred stereolithography apparatus 10 (SLA) for use with the instant invention. The basic components of a stereolithography apparatus are described in U.S. Pat. No. 4,575,330 issued Mar. 11, 1986, to Hull; U.S. Pat. No. 5,184,307 issued Feb. 2, 1993, to Hull, et al.; and U.S. Pat. No. 5,182,715 issued Jan. 26, 1993, to Vorgitch, et al. as referenced above. The preferred stereolithography apparatus as shown in FIGS. 1*a* and 1*b* includes container 12 (i.e. vat) for holding building material 14 (e.g. photopolymerizable material) from which an object 16 will be formed, an elevator 18 and elevator driving means (not shown), an elevator platform 20, an exposure system 22, a recoating bar 24 and recoating bar driving means (not shown), and at least one computer for manipulating object data (as needed) and for controlling the exposure system, elevator, and recoating devices.

A preferred scanning system is described in several of the patents, applications and publications referenced above including U.S. Pat. No. 5,058,988 issued Oct. 22, 1991, to Spence; U.S. Pat. No. 5,059,021 issued Oct. 22, 1991, to Spence, et al.; U.S. Pat. No. 5,123,734 issued Jun. 23, 1992, to Almquist, et al.; U.S. Pat. No. 5,133,987 issued Jul. 28, 1992, to Spence, et al.; and U.S. Pat. No. 5,840,239 issued Nov. 24, 1998, to Partanen, et al. herein incorporated by reference. This preferred system includes the use of a laser, beam expander (may be separate or included in the laser), and a pair of computer controlled XY rotatable scanning mirrors of either the motor driven or galvanometer type.

Preferred control and data manipulation systems and software are described in a number of the patents referenced above, including U.S. Pat. No. 5,184,307 issued Feb. 2, 1993, to Hull, et al.; U.S. Pat. No. 5,321,622 issued Jun. 14, 1994, to Snead, et al.; and U.S. Pat. No. 5,597,520 issued Jan. 28, 1997, to Smalley, et al. herein incorporated by reference. A preferred recoating device is described in U.S. patent application Ser. No. 08/790,005, filed Jan. 28, 1997, U.S. Pat. No. 5,902,537, issued May 11, 1999 to Almquist, et al. as referenced above and includes recoater bar 24, regulated vacuum pump 26, and vacuum line 28 connecting the bar 24 and the pump 26.

Other components of a stereolithography apparatus (not shown) may include a liquid level control system, a build chamber, an environmental control system including a temperature control system, safety interlocks, a viewing device, and the like. It should be understood that the instant invention is applicable to object formation using a system that lacks one or more of the elements mentioned herein, and is applicable to a system that includes all elements mentioned herein, or adds additional elements.

Stereolithography apparatuses on which the instant invention can be utilized are available from 3D Systems, Inc. of Valencia, Calif. These include stereolithography apparatuses using a HeCd laser operating at 325 nm, and stereolithography apparatus using a solid state laser operating at 354.7 nm. Preferred building materials are photopolymerizable materials manufactured by CIBA Specialty Chemicals of Los Angeles, Calif., and are available from 3D Systems, Inc. These materials manufactured by CIBA Specialty Chemicals include SL 5170, SL 5190, SL 5195, SL 5220, SL 5510, and SL 5520.

The typical operation of a stereolithography apparatus involves alternating formation of layers of material (i.e. coatings of material) and the selective solidification of those layers to form an object from a plurality of adhered laminae. The process typically begins with the elevator platform 20 immersed approximately one layer thickness below the upper surface 30 of the photopolymerizable material 14. The layer of photopolymerizable material is selectively exposed to stimulation (e.g. a beam of UV radiation) which cures the material to a desired depth to form an initial lamina of the object adhered to the elevator platform. This initial lamina corresponds to an initial cross-section of the object to be formed or corresponds to supports, which may be used to adhere the object to the platform. After formation of this initial lamina, the elevator platform and adhered initial lamina are lowered a net amount of one layer thickness into the material.

As the material is typically viscous, and the thickness of each layer is very thin (e.g. 0.025 mm to 0.25 mm (0.001 to 0.010 inch)), the material may not readily form a layer over the last solidified lamina. In the case where a layer is not readily formed, a recoating device may be swept at or somewhat above the surface of the resin (i.e. working surface of the material) to aid in the formation of a fresh layer of material. The layer formation process may involve the sweeping of the recoating bar 24 one or more times at a desired velocity. After formation of this second layer of material, a portion of this second layer is solidified by exposure of the medium to stimulation according to data representing a second cross-section of the object. In alternative processes, layer formation over one portion of a previous lamina may occur simultaneously with exposure of an already formed portion of the layer. This process of layer formation and solidification is repeated over and over again until the object 16 is formed from a plurality of adhered layers (32, 34, 36, 38, 40, 42, and 44) as shown in FIG. 1b.

The stereolithography apparatus may form one or more objects at one time. These objects may be multiple copies, all of the same shape and size, may be two or more different shapes and/or sizes, or may be a combination of copies of similar shapes and sizes or different shapes and/or sizes. Even for a single object, a cross-section may include multiple isolated regions based on object geometry. The area of the liquid container generally dictates the number and size of objects formed at one time, although it is possible to "stack" objects in the Z-dimension.

The solidification process typically consists of the solidification of various regions, which are typically classified as "vector types". The use of boundary, hatch, and fill vectors is well known in the art, and is taught in a number of the previously cited publications and patents such as previously referenced U.S. Pat. No. 5,321,622 issued Jun. 14, 1994, to Snead, et al. Briefly then, "boundaries" are border regions surrounding an area of a cross section. The area may be that of a whole cross-section or a portion of a cross-section. Boundaries may be defined, inter alia, to surround up-facing cross-sectional regions, down-facing cross-sectional regions, and continuing cross-sectional regions (regions that face neither up nor down). Boundary vectors may be exposed one or more times, or may be offset and exposed one or more times, or may not be exposed at all.

"Skin Fill", or "Fill", "Skin", is typically an exterior portion of the cross section that faces either upward or downward and is thus an area that is typically completely exposed so as to form a solid surface region. "Hatch" is found within continuing regions or boundaries and may or may not be found in down- and up-facing exterior regions. Hatch may consist of a series of lines, point exposures (i.e. bullets), tiling patterns, or other patterns of exposure. Hatch patterns may result in complete solidification of the boundary regions within which they are used, or may result in partial solidification of those regions. Hatch and skin patterns may consist of overlaid exposures, crossing exposures, or repeated exposures. Hatch and/or fill may be retracted from one or more boundaries. Especially, hatch and/or fill may be retracted from a first boundary that is exposed.

In one classification scheme (as described in U.S. Pat. No. 5,321,622 issued Jun. 14, 1994, to Snead, et al.) each lamina of the object can contain one, two, or three different regions: (1) down-facing regions; (2) up-facing regions, and/or (3)

continuing regions (i.e. regions that are neither down-facing nor up-facing). In this scheme, the following eight vector types might be utilized though others may be defined and used:

| | |
|---|---|
| Down-facing boundaries | Boundaries that surround down-facing regions of the object. |
| Up-facing boundaries | Boundaries that surround up-facing regions of the object. |
| Continuing boundaries | Boundaries that surround regions of the object that are neither up-facing nor down-facing |
| Down-facing Hatch | Lines of exposure that are positioned within the down-facing boundaries. These lines may be closely or widely spaced from one another and may extend in one or more directions. |
| Up-facing Hatch | Lines of exposure that are positioned within the up-facing boundaries. These lines may be closely or widely spaced from one another and may extend in one or more directions. |
| Continuing Hatch | Lines of exposure that are positioned within continuing boundaries. These lines may be closely or widely spaced from one another and may extend in one or more directions. |
| Down-facing Skin | Lines of exposure that are positioned within the down-facing boundaries and closely spaced so as to form a continuous region of solidified material. |
| Up-facing Skin | Lines of exposure that are positioned within the up-facing boundaries and closely spaced so as to form a continuous region of solidified material. |

Taken together, the down-facing boundaries, down-facing hatch and down-facing fill define the down-facing regions of the object. The up-facing boundaries, up-facing hatch, and up-facing fill define the up-facing regions of the object. The continuing boundaries and continuing hatch define the continuing regions of the object.

Other schemes for region identification and vector type creation are described in various patents and applications referenced above, including U.S. Pat. No. 5,184,307 issued Feb. 2, 1993, to Hull, et al., U.S. Pat. No. 5,209,878 issued May 11,1993, to Smalley, et al., U.S. Pat. No. 5,238,639 issued Aug. 24,1993, to Vinson, et al., U.S. Pat. No. 5,597,520 issued Jan. 28, 1997 to Smalley, et al., PCT Publication WO 97/11837 published Apr. 3, 1997 by Leyden, et al., and U.S. application Ser. No. 08/855,125 filed May 13, 1997, by Nguyen. Some schemes might involve the use of fewer designations such as: (1) defining only outward facing regions and continuing regions where down-facing and up-facing regions are combined to form the outward facing regions; (2) combining all fill types into a single designation; or (3) combining up-facing and continuing hatch into a single designation or even all three hatch types into a single designation. Other schemes might involve the use of more designations such as dividing one or both of the up-facing and down-facing regions into flat regions and near-flat regions, as described in U.S. Pat. No. 5,184,307 issued Feb. 2, 1993, to Hull, et al.

Other region identifications might involve the identification of which portions of boundary regions associated with each lamina are outward facing and/or interior to the lamina. Interior boundaries are bounded on both sides by object portions of the lamina whereas outward boundaries are bounded on one side by an object portion of the lamina and on the other side by a non-object portion of the lamina. Outward facing boundary regions are associated with the initial cross-section boundaries (i.e. the cross-sectional boundary regions existing prior to dividing them into down-facing, up-facing, and continuing boundary regions) described in U.S. Pat. No. 5,321,622 issued Jun. 14, 1994, to Snead, et al. and U.S. Pat. No. 5,597,520 issued Jan. 28,1997, to Smalley, et al.

Various solidification techniques may be used to expose the medium to stimulation. One possible solidification technique begins with exposure of the boundaries. Next, the area inside the boundaries is exposed with hatch vectors and/or fill vectors. This may be accomplished with one or more passes of the laser beam across the area inside the boundaries, but preferably with two passes. In the event that two passes are used, it is preferable that the two passes occur in different, and typically perpendicular, directions. In this case, the first pass of the laser beam scans the object cross-section in a first direction, and the second pass scans the object cross-section in a second direction, generally perpendicular to the first direction. Depending on the position of the cross-section in relationship to the cross-sections above and below it, additional scanning of portions or all of the cross section may be accomplished with fill vectors or the like.

Another possible solidification technique begins with the scanning of one or more passes of hatch vectors, then any fill vectors necessary, followed with the boundary vectors. Yet another solidification technique may begin with a first pass of hatch vectors in one direction, then the scanning of the boundary vectors, then the second pass of hatch vectors in a second direction, and ending with the fill vectors.

It is also possible that more than one pass of boundary or fill vectors is desirable, that multiple passes of fill vectors may be in one or more directions, and/or that multiple passes of boundary vectors may be offset from one another. Other solidification techniques may use fill vectors, and no hatch vectors, or may use hatch vectors, and no fill vectors. These techniques may or may not include the use of one or more boundary vectors.

Other solidification techniques may involve the use of raster exposures in one or more directions, or even combinations of vector and raster exposures. Hatch and/or fill may be exposed in patterns that spiral inward or outward or track boundary paths.

A large variety of solidification techniques may be derived from the above examples, given for example, that the one or more passes of hatch vectors in one or more directions, one or more passes of boundary vectors, and one or more passes of fill vectors in one or more directions may be performed in various sequences. The sequence or sequences chosen may involve exposure of multiple passes of the same vector type in sequence, or may involve separating the multiple passes of the same vector type with exposure of a different vector type or types.

In some embodiments, different sized beams may be used for exposing a layer. A relatively narrow beam (e.g. small diameter) may be used for one or more border vectors. A relatively narrow beam may be thinner than about 0.500 mm (0.020 inch), and preferably thinner than about 0.380 mm (0.015 inch). Alternatively, a relatively wide beam may be used for some border vectors, while a narrower beam is used for other border vectors. A relatively wide beam may be wider than about 0.380 mm (0.015 inch), and preferably wider than about 0.500 mm (0.020 inch). The relatively wide beam is preferably wider than the relatively narrow beam. Hatch and fill vectors may be drawn with a relatively narrow or relatively wide beam, or with a combination of relatively narrow and relatively wide beams. The determination of whether to use a relatively narrow beam, a relatively wide beam, or a combination, may be generally based on the feature size and/or feature geometry.

Additional possibilities include solidification by a mask and flood exposure technique, use of deformable mirrors, and other transmissive or reflective light valve techniques.

In addition, the solidification techniques may involve a pause, or delay, after exposure of at least a portion of a cross section. A delay may follow the exposure of all or some boundary, hatch, or fill vectors, in one or more directions. This delay may be used as a shrinkage period, where shrinkage results from, inter alia, one or both of chemical bond formation and cooling of the area last solidified by the laser.

In some methods of rapid prototyping, it is preferred to provide information regarding certain parameters, such as layer thickness, to the machine, in preparation for building. These parameters may control many of the actions that precede and/or occur during building. It is also possible that these parameters are predetermined. In the case of laminated object manufacturing, for example, the layer thickness may be determined by the thickness of the sheet material being used. In other methods, however, the layer thickness may be specified, within a given range, by the user.

The given range for a parameter may be dependent on a number of conditions. For instance, a parameter may be the speed of scanning a laser beam over the surface of a material. Depending on the material, it may not be practical to scan any faster than a determined speed, as the desired affect—cutting of a sheet, fusing of a powder, solidification of a polymerizable liquid, and the like—may not be attainable. On the other hand, scanning slower than a certain speed may be undesirable. For example, scanning too slowly may result in cutting through too many sheets, or burning a powder while trying to fuse it, or solidifying too deeply into a container of polymerizable liquid. Of course, scanning slower also takes more time, so any lower limit may also take into consideration the impact on build time.

There are many possible parameters. For example, parameters preferably used in liquid-based stereolithography may include but are not limited to: 1) layer thickness, 2) X&Y shrinkage compensation, 3) Z shrinkage compensation, 4) border overcure, 5) hatch overcure, 6) hatch type, 7) hatch spacing, 8) staggered weave, 9) alternate sequencing, 10) retraction: start, 11) retraction: end, 12) fill cure depth, 13) fill type, 14) fill spacing, 15 beam compensation on/off, 16) beam compensation value, 17) auto Z-correct, 18) additional boundaries, 19) boundary compensation, 20) Z-level wait, 21) pre-dip delay, 22) Z-dip velocity, 23) Z-dip distance, 24) number of sweeps, 25) gap percent, and 26) sweep velocity.

These parameters are preferably grouped based on the type of object to which they apply. For example, some parameters may be used with objects, and some may be used with supports. Not all parameters will typically apply in all cases, and based on circumstances, additional parameters may be added. While building the supports that hold the objects in place during part building, for example, only a selection of the above parameters are preferred. For instance, layer thickness (1), border overcure (4), Z-level wait (20), Pre-dip delay (21), Z-dip velocity (22), Z-dip distance (23), and number of sweeps (24) may be used from the list above. Additional parameters may also be used, such as a parameter known as line spacing, depending on how the supports were created.

Groupings of parameters may alternatively and/or additionally be based on the portion of the build process to which they apply. For instance, some parameters may be useful during the creation of a fresh layer of liquid (i.e. recoating), while other parameters may determine how the solidification of the layer is carried out. Some recoating parameters from the list above include numbers (20)–(26). Some of the parameters from the list above affecting layer solidification include numbers (1)–(19).

Yet other groupings may be created based on the parameters needed to automatically generate supports. Parameters for this group may include support type or types, minimum spacing between supports, gusset angle, and/or support height. Additional and/or alternative groupings may be used, and additional and/or alternative parameters may be used in any of the groupings given as examples above.

It is preferred to keep groups of related parameters together in files. In a preferred stereolithography system, these files are known as style files. The contents of style files may vary for the reasons stated above, and based on a number of other variables. These other variables may include the stereolithography machine type, the resin type, the type of recoating device (if any), and other variables.

A preferred embodiment of the instant invention involves automating the process of choosing the correct parameters during preparation of a build process. As described above, related parameters are preferably grouped in style files. By automating the process of selecting the proper style files, the likelihood of building with the correct sets of parameters may be greatly increased.

In a preferred stereolithography machine, an ASCII file, preferably called the StylesWizardin.ini, is supplied with the machine software. The preferred configuration and contents of the StylesWizardin.ini file are shown in FIGS. 2a–2e. The file preferably contains a list of preparation and building styles and different configurations of stereolithography machines created by 3D Systems, Inc. of Valencia, Calif.

This preferred StylesWizardin.ini file has several sections. Each section preferably contains information useful for presenting the correct choices during each step of the style selection process. In an alternative, the sections of the file may appear in a different order, and/or may contain different headings and/or data. The first section, shown in FIG. 2a, preferably contains names of photopolymerizable materials used with each available machine/recoater device combination. For example, where "[SLA250-REGULAR]" appears in the file, the photopolymerizable material names listed below it may be used with an SLA 250 with a regular doctor blade. There are preferably nine different machine/recoater device combinations in the file. Following each combination name is the name or names of photopolymerizable materials that can be used with the combination. Other materials may be available that are not listed. Additional or fewer machine/recoater device combinations may appear in the file, depending on the systems and system configurations currently available.

The second section of the StylesWizardln.ini file preferably contains abbreviations for a number of build styles created by 3D Systems, Inc. The styles contained in the file of FIG. 2a are Tooling (indicated by T), Fast (indicated by F), Exact (indicated by X), Hexagon-Quickcast (indicated by H), Box-QuickCast (indicated by B), and Triangle-QuickCast (indicated by Q). These styles indicate types of building methods that may preferably be used to create objects. An object built with the Tooling style, for example, is typically highly accurate, but may take longer to build than an object built with the Fast build style. An object built with the Exact build style is typically more accurate than an object built with the Fast style, and the Exact object may take longer to build. In addition, the Exact object may be less accurate than the Tooling object, but the Exact object will typically build faster.

The Fast, Exact, and Tooling styles typically produce solid objects, whereas the QuickCast styles preferably produce objects with a continuous surface around an internal lattice structure. The three QuickCast styles named above indicate the pattern used for the internal structure of the object. Refer to U.S. Pat. Nos. 5,855,718 issued Jan. 5, 1999 to Nguyen, et al., U.S. Pat. No. 5,256,340 issued Oct. 26, 1993 to Allison, et al., and U.S. application Ser. Nos. 08/766,956 filed Dec. 16, 1996 by Gigl, et al., now U.S. Pat. No. 5,965,079 and Ser. No. 08/920,428 filed Aug. 29, 1997 by Kruger, et al., now U.S. Pat. No. 5,902,538 all herein incorporated by reference as if set forth in full, for more information about build styles. In an alternative, other build styles may be used.

The third section of the StylesWizardin.ini file preferably contains abbreviations for a number of geometric features. A feature may be used to describe an object to be built. The types of features listed in the file of FIG. 2b are V, for Trapped Volume, L, meaning Large Flat Surface, I, for Near Flat Inclined Surface, D, meaning Delicate Feature, and G, to indicate General Part with no specific important surface feature. Although an object may contain one or more of these features, it should be possible to choose a category that an object best fits. In a preferred embodiment, all objects are given a designation of G, for General Part. In an alternative, the user may choose from this set of features, or an alternative set of features. In yet another alternative, the software will determine the best option based on analysis of the object data.

The fourth section of the StylesWizardln.ini file, shown in FIG. 2b, preferably contains a list of all the default layer thicknesses used in the styles supplied by 3D Systems, Inc. The first set of values preferably indicates inch values, without the initial decimal point. For instance, the first number shown, 0010, represents the value 0.0010 inch. The second set of values preferably indicates mm values, without the initial decimal point. For example, the first number of this set, 0250, represents 0.0250 mm. In an alternative, the units may be formatted differently and/or may appear in a different order.

The fifth section of the StylesWizardin.ini file, shown in FIG. 2b, preferably contains the list of all the photopolymerizable materials for which default build styles are currently supplied by 3D Systems, Inc. The heading for the fifth section is preferably [Resins].

The sixth section of the StylesWizardin.ini file, shown in FIGS. 2c–2e, preferably contains a list all the default part build styles supplied by 3D Systems, Inc. In an alternative, other build styles may be listed, for example, styles created by the user. Each style is preferably categorized into a subsection. The subsection name (the heading in square brackets) preferably indicates the type of stereolithography machine, the type of recoating device, and the type of photopolymerizable material. For example, [SLA250-R-SL5149] is preferably the heading for the section containing default part build styles for an SLA 250 machine with a doctor blade and SL5149 photopolymerizable material (manufactured by CIBA Specialty Chemicals of Los Angeles, Calif.).

A preferred method of practicing the invention, using the preferred StylesWizardln.ini file just described, is presented below and summarized in FIG. 3. First, the user provides data 50 for an object or objects being formed. The user is then ready to begin data preparation 52 for object formation. The software presents questions 56 for the user to answer 58, until the final question is asked and answered 60. Based on the answers gathered, the software determines the appropriate style file names 62, and displays the names. If the style files are acceptable 66, the process is complete 68, otherwise, the data preparation process 52 may be restarted.

Figure 4:
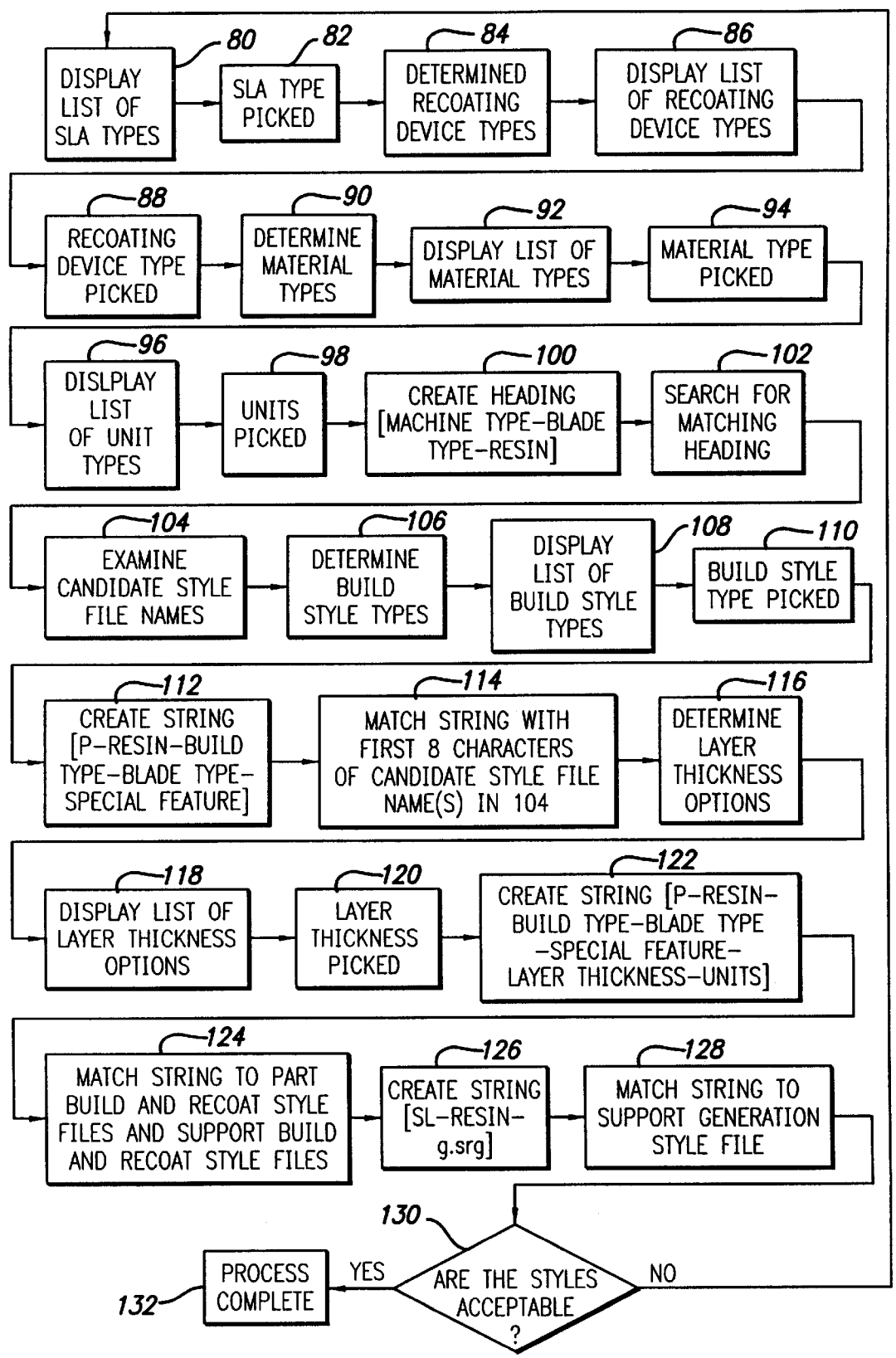
FIG. 4 is a flow chart depicting a preferred embodiment of the invention.
Figure 5:
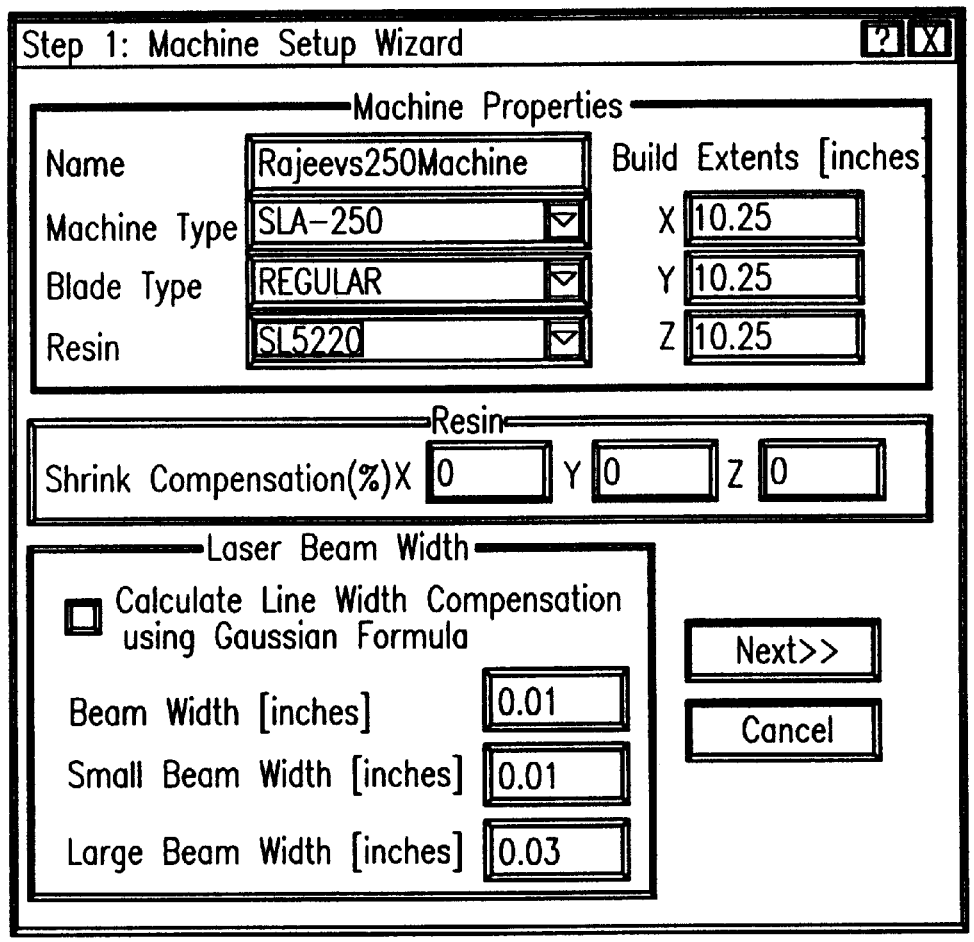
FIGS. 5–9 depict software user interface windows for practicing a preferred embodiment of the invention.

The preferred method of practicing the invention is now described in more detail, with references to FIGS. 4–9. When the user begins a preparation session, the window in FIG. 5 is displayed. In the top rectangle, to the right of the "Name:" label, the user can type in a name for the machine. The rectangle directly below is for "Machine Type". The user picks the machine type from a list that is displayed (reference 80 in FIG. 4) when the button with a picture of a down arrow, at the right side of the rectangle, is activated by the mouse pointer. The options are: SLA 190, SLA 250, SLA 350, SLA 3500, SLA 500, SLA 5000, and SLA 7000.

As soon as the user picks the machine type 82, the StylesWizardln.ini file is opened. All the different recoating device types pertaining to the selected machine are obtained from section 1 of the file. The algorithm searches all the headings (the text in square brackets) in section 1. When the heading or headings with a machine type matching the option chosen are found, the options available for the machine property, "Blade Type" 84 are dynamically changed. For example, if the user selects a Machine Type SLA 250, the recoating device, or "Blade Type" options become "Regular", meaning a doctor blade, and "Zephyr", meaning the Zephyr™ recoating device, as found on various stereolithography apparatuses produced by 3D Systems, Inc. For this SLA 250 example, these two options will be available for selection from the list for the "Blade Type". On the other hand, for an SLA 5000 machine, the only possible choice is "Zephyr". When there is only one option, as in this last example, the setting is preferably automatically chosen for the user.

The user then activates the list 86 in the rectangle to the right of the "Blade Type:" label, to see the list of options available. As with Machine Type, the user can only pick one option from the list. As soon as the user selects the Blade Type 88; the StylesWizardln.ini file is re-opened. The algorithm then scans section 1 to find the category that matches the selections chosen thus far by the user: Machine Type and Blade Type. For example, if the user picked SLA 250 and Regular blade, then the algorithm will search for the heading [SLA250-REGULAR]. Once this heading is found, all the photopolymerizable material names listed under this heading are inserted 90 in the options list for "Resin". In this example, the three names SL5149, SL5170 and SL5220 are available 92 from the Resin options list.

The user then picks the material type 94 from the list shown by activating the button on the right side of the "Resin" rectangle. Once again, the user can only pick one option from the list.

The remaining fields in the window shown in FIG. 5 are used to gather information that is not used to determine the styles that will be chosen. The additional parameters from these remaining fields are used by the data slicing software when preparing cross-sectional data for the object. Previously referenced U.S. Pat. No. 5,182,715 issued Jan. 26, 1993 to Vorgitch, et al., U.S. Pat. No. 5,184,307 issued Feb. 2, 1993 to Hull, et al., and U.S. Pat. No. 5,321,622 issued Jun. 14, 1994 to Snead, et al. describe slicing operation and generation of build data. Once the user is satisfied with the entry for each option, the user can click on the button labeled "Next" to go to the next step of the process. In all the windows displayed during a preparation session, the user may also preferably click "Cancel" button to terminate the preparation session.

Figure 6:
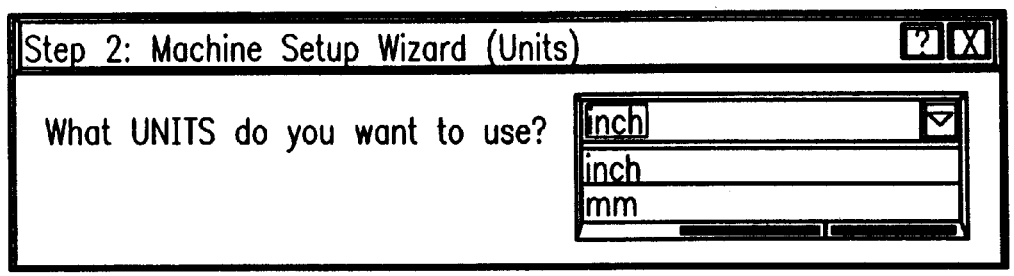

Once the user has completed the preceding steps, the program has gathered the following: Machine Type, Blade Type, and Resin Type. The window shown in FIG. 6 is then displayed.

In this window, the user indicates whether the data file being prepared is in inches or in millimeters (reference 96 in FIG. 4). After selecting the units 98, the user can click on the button labeled "Next" to go to the next step of the process. In this, and the remaining windows displayed during a preparation session, the user may also click on a button labeled "Prev" to return to the previous window.

Figure 7:
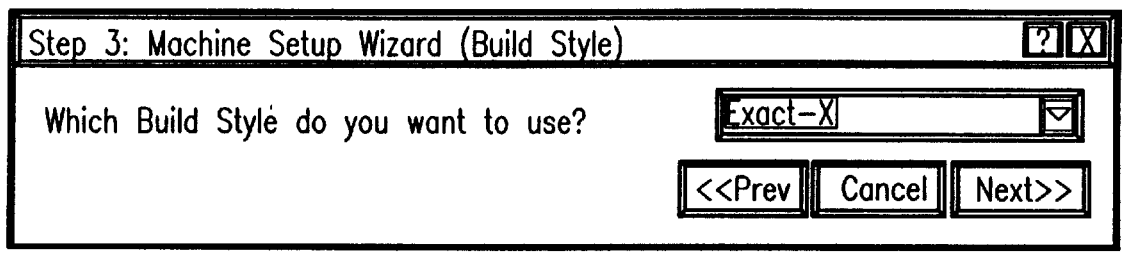

Once the user has completed the preceding steps, the program has gathered the following: Machine Type, Blade Type, Resin Type, and Units. The window shown in FIG. 7 is then displayed.

Before this window appears, the program uses the information it has gathered thus far to create a heading indicating [Machine Type—Blade Type—Resin] (reference 100 in FIG. 4). For example, a possible heading is [SLA250-R-SL5220]. Once this heading is obtained, the algorithm re-opens the StyleWizardin.ini file and searches for a matching heading 102 in the sixth section of the file. Once the heading is found, all the part build style names under that heading are analyzed 104. The fifth character in the filenames under the appropriate heading indicate the possible build styles 106 that the user is allowed to pick.

In the above example, since the heading is [SLA250-R-SL5220], the candidate style files from the StyleWizardIn.ini file are p5220hrg0060, p5220frg0060, p5220fri0060, p5220xrg0060, and p5220xri0060. The unique fifth characters are "h", "f", and "x". Thus, the user is only allowed to select one build style from Hexagon-QuickCast (h), Fast (f), and Exact (x). These three options are added to the Build Style selections 108 available from the window in FIG. 7, from which the user can pick one (reference 110 in FIG. 4). The user then clicks on the button labeled "Next" to go to the next step of the process.

Once the user has completed the preceding steps, the program has gathered the following information: Machine Type, Blade Type, Resin Type, Units, and Build Style. The program uses this information to create a string with the following pieces: P—Resin—Build Type—Blade Type—Special Feature (reference 112 in FIG. 4). The initial "P" indicates that these are parameters selected for the building of an object, referred to here as a Part, as opposed to a support. When referring to supports, the initial letter is an "S". As mentioned earlier, the "Special Feature" defaults to "g" to indicate a General Part, in a preferred embodiment. Using the options from the example above, the string would be p5220xrg. Again, the initial "p" stands for "part", or object. This string is matched 114 with the candidate style file names that were determined earlier 104, which were p5220hrg0060, p5220frg0060, p5220fri0060, p5220xrg0060, and p5220xri0060 for the present example. A match is found in the fourth file name, as the string and the first eight characters of the fourth file name are identical. In this example there is only one match. In other cases, there may be multiple matches.

Figure 8:
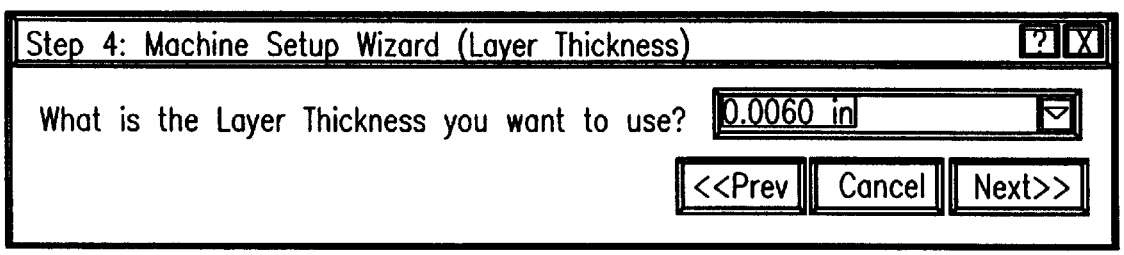

The last four digits of the matched file name(s) determine the layer thickness options available in FIG. 8 (reference also 116 in FIG. 4). If there is only one match, and thus, only one acceptable layer thickness, this thickness is automatically selected for the user, rather than offering a list of options 118. Continuing with the example above, since the units were inches, 0.006 inch is the only available choice. If the user had selected mm units, then 0.150 mm would have been the layer thickness. After selecting the desired layer thickness 120, the user can then click on the button labeled "Next" to go to the next step of the process.

Once the user selects the layer thickness, all the information required to pick the appropriate set of Build Styles is available. The program uses this information to create a string with the following parts: P—Resin—Build Type—Blade Type—Special Feature—Layer Thickness—units (reference 122 in FIG. 4). For the example above, the string would be p5220xrg0060in.

Given this string, the software knows where to find the style file matching 124 the user-indicated settings. As the example above results in the string p5220xrg0060in, the software looks for a matching part build style named p5220xrg0060in.sty and a matching part recoating style file named p5220xrg0060in.rcs. To obtain the support styles, the character "s" replaces the first character "p" from the part style file names.

Hence, the support build style file is s5220xrg0060in.sty, and the support recoat style file is s5220xrg0060in.rcs.

One additional style file is desired: a support generation style. To obtain the support generation style, the program creates a string with the following parts: [SL- Resin-g.srg] (reference 126 in FIG. 4). Continuing the example from above, the support generation style matched to the string 128 would be SL5220g.srg.

At this stage, the program has identified the desired style file names. Next, the algorithm determines the directory in which the styles are located. This process is preferably fully automated and requires no user input. The program already has the knowledge about where the software has been installed. The initially determined style file names are appended to the appropriate directory path to obtain the full path and name for all the styles.

Figure 9:
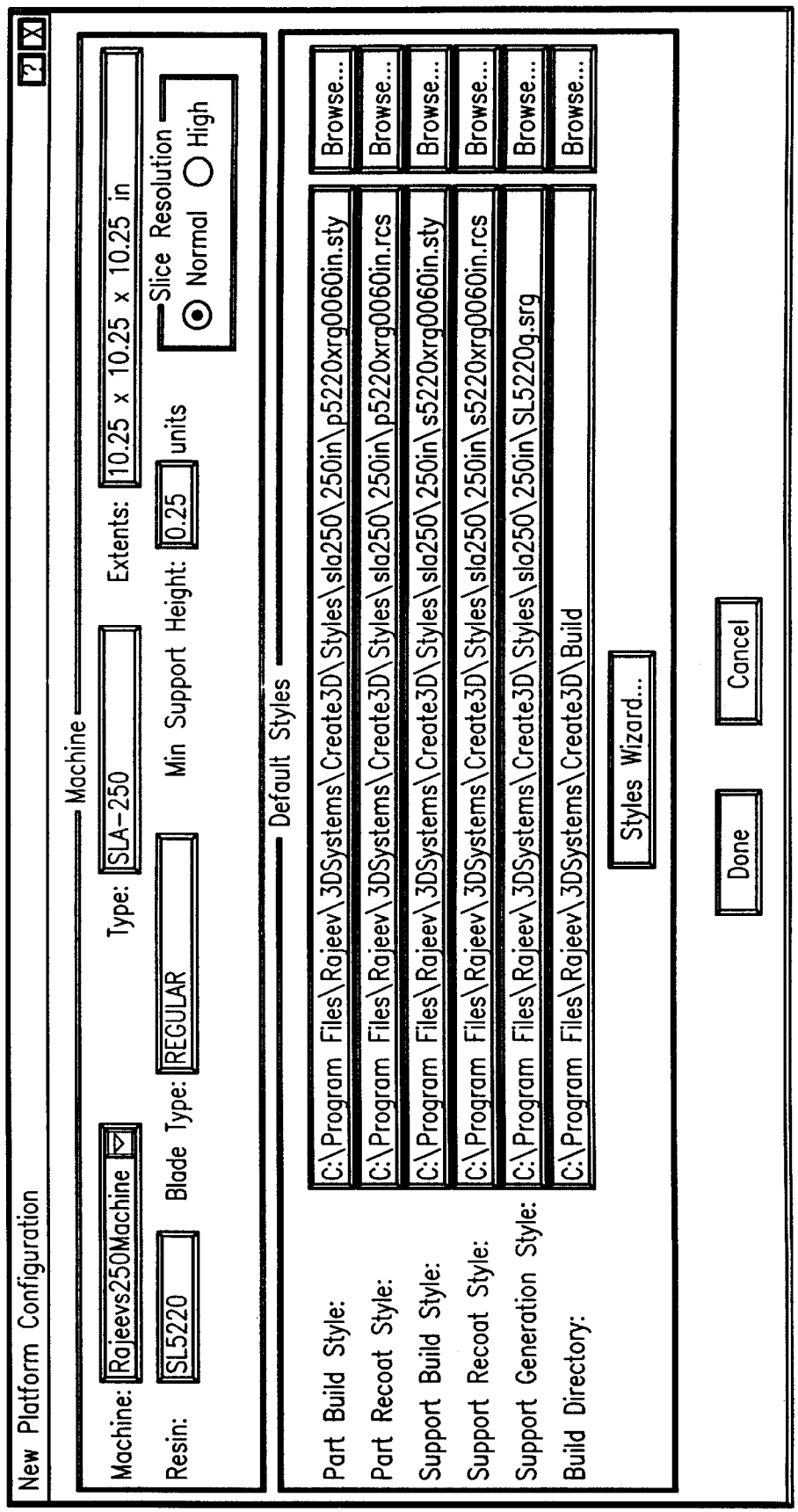

If one or more of the desired style files is not found, the user is informed about it by an error message displayed on the screen. When the style files are found, the window shown in FIG. 9 is then presented to the user. This window shows all the choices the user has made, along with the set of five styles that were selected as a result. If the user is not satisfied with a choice 130, he can restart the entire process by clicking on the button labeled "Styles Wizard". Alternatively, the user can click on one or more of the buttons labeled "Browse . . . " to open a new window from which the system's file directory structure may be navigated by the user in order to arrive at the desired file. Then, the user may pick the desired file, and this path and filename replace the previous entry for the file type chosen. If the user is satisfied with the displayed style files, the process is complete 132.

Alternatives

It should be understood that the preferred embodiment is not limited to the specific parameters utilized in the examples given above, but instead can be applied using various parameters. For example, the name, format and contents of the StylesWizardin.ini file may, of course, vary. For instance, the file may be in binary, rather than ASCII format. In addition, the order and number of entries in the file may change as required or desired to simplify or expand the parameter lists, to work with, for example, technologies other than liquid-based stereolithography. The parameters may also be found in more than one file.

In each section of the file, additions and deletions may be made. For instance, if desired, a new resin may be added, along with changes to other sections to support preferred parameters for building with the new resin. For instance, if a layer thickness is developed for building with this resin that is different than the existing layer thickness choices, a new entry could be added to the layer thickness section of the file. If a new build style is created, its name may be added to the section containing the existing build styles.

In another alternative, the windows that appear throughout the process of the embodiment above may be formatted a variety of ways, including the possible merging of data from more than one window onto one window, and including splitting information from one window onto more than one window. For example, rather than prompt for the Machine Type, Blade Type, and Resin on one screen, each of these may appear on its own window. However, if preferred, the Machine Type, Blade Type, and Resin may be joined on one screen with Units, Build Style, and Layer Thickness.

If all, or even just some, of the prompts are displayed in one window, it would be preferable that the options that are listed for each prompt are dynamically changed. That is, as choices are made for one prompt, the options available at the other prompts are updated.

In another alternative, when there is only one option available in response to a prompt or prompts, the prompt(s) may be skipped. For instance, if only one layer thickness is available for the chosen SLA, blade type, resin, and build style combination, then the layer thickness prompt does not need to be displayed. In addition, if some values are set as defaults on a system, the associated prompt(s) do not need to appear. For instance, if a system is setup with Units defaulting to mm, this prompt need not be displayed, unless some indication is made that the defaults should not be in affect for a given preparation session.

Similarly, a number of the choices may be automatically set, such as Machine Type. Like Blade Type and possibly Resin, these settings are not likely to change often. Therefore, it may be preferable to set these options once, and not be asked during each preparation session. When these settings need to change, an indication may be made that the defaults are not in effect for the preparation session, or the settings may be changed by a number of other means. Examples of other means include editing a file containing these rarely changed options, or an ability of the software to display a window containing these option. This window allow the user to choose from the existing alternatives.

In another alternative, the feature type may be automatically determined. This determination may be based on a series of answers the user provides to questions from the system. Alternatively, the object data may be analyzed to determine the proper feature type to use.

In yet another alternative, information that is not used to determine the proper styles is not gathered in the same session that is used to determine the styles. This information may instead be gathered from a different window. Alternatively, additional information may be requested during a preparation session. This may include information such as number of copies to build at once. In another alternative, information may be requested in a different order than that presented above.

The embodiment and alternatives can be modified according to various teachings in the above incorporated patents and applications. Furthermore, it is believed that the teachings herein can be applied to other Rapid Prototyping and Manufacturing technologies.

Though a particular embodiment has been described and illustrated and many alternatives proposed, upon review of the teachings herein, many additional embodiments and alternatives will be apparent to those of skill in the art. As such, the embodiment and alternatives presented herein are not intended to limit the scope of the invention, but instead to be exemplary in nature.

The above embodiment and alternatives provide simplified techniques for associating required/desired parameters with object data in preparation for forming objects using a Rapid Prototyping and Manufacturing technique. The embodiment and alternatives also speed the process of preparing object data so that laminae formation may begin with less delay. These advantages may be achieved alone and in combination.

We claim:

1. A stereolithographic method of forming a three-dimensional object from a plurality of adhered laminae by exposing successive layers of a material to prescribed stimulation, comprising:

providing data representing an object to be formed;

providing answers to a series of questions, including answers to stereolithographic machine type, recoating device, material type, and data file units;

automatically determining a group of styles to be used in forming the object, wherein the determination is derived based on the answers provided, the styles including build styles and support styles;

forming a layer of material according to at least one of the styles of the group, wherein the layer is formed in preparation for forming a successive lamina of the object, the layer in the object being formed according to at least one selected build style that includes geometric features;

exposing the material to the prescribed stimulation to form a successive lamina of the object, wherein the exposure is performed according to at least one of the styles of the group; and repeating the acts of forming and exposing a plurality of times in order to form the object from a plurality of laminae.

2. The method of claim 1 wherein the group of styles comprises a style setting forth build parameters for use in solidifying layers of the material.

3. The method of claim 1 wherein the group of styles comprises a style setting forth recoating parameters for use in forming layers of material.

4. The method of claim 1 wherein the group of styles comprises a style setting forth build parameters associated with a support structure for use in solidifying layers of the material.

5. The method of claim 1 wherein the group of styles comprises a style setting forth recoating parameters for use in forming layers of the material that contain support data but not object data.

6. The method of claim 1 wherein the group of styles comprises a style setting forth information for generating a support structure.

7. The method of claim 1 wherein the answers comprise indicating machine type from a list of possibilities that are compatible with any previously answered questions.

8. The method of claim 1 wherein the answers comprise indicating the recoater type from a list of possibilities that are compatible with any previously answered questions.

9. The method of claim 1 wherein the answers comprise indicating resin type from a list of possibilities that are compatible with any previously answered questions.

10. The method of claim 1 wherein the answers comprise indicating the units from a list of possibilities that are compatible with any previously answered questions.

11. The method of claim 1 wherein the answers comprise selecting a build type from a list of possibilities that are compatible with any previously answered questions.

12. The method of claim 1 wherein the answers comprise selecting a layer thickness from a list of possibilities that are compatible with any previously answered questions.

13. The method of claim 1 wherein the answers comprise selecting a geometric shape characteristic of the object from a list of possibilities.

14. The method of claim 13 wherein the possibilities include one or more of (1) general, (2) trapped volume, (3) large flat surface, (4) near-flat inclined surface, and (5) delicate.

15. The method of claim 1 wherein a range of layers is specified in which to apply one or more the derived styles.

16. The method of claim 1 wherein at least one of the answers is provided automatically.

17. The method of claim 16 wherein the geometric shape characteristic is provided automatically based on a software analysis of the object geometry.

18. An apparatus for forming a three-dimensional object from a plurality of adhered laminae by exposing successive layers of a material to prescribed stimulation, comprising:

a memory for receiving data representing an object;

a memory for receiving answers to a series of questions, including answers to stereolithographic machine types, recoating device, material type and data file units;

a computer programmed to automatically determine a group of styles to be used in forming the object based on the answers provided, the styles including build styles and support styles;

a coating system for forming a layer of material, according to a style forming part of the group, adjacent to any last formed layer of material in preparation for forming a subsequent lamina of the object;

an exposure system for selectively applying prescribed stimulation to the layer, according to the object data and a style forming part of the group, to form a successive lamina of the object; and a control computer programmed to operate the coating system and the exposure system in order to form the object from a plurality of adhered laminae.

19. An apparatus for forming a three-dimensional object from a plurality of adhered laminae by exposing successive layers of a material to prescribed stimulation, comprising:

means for receiving data representing an object;

means for receiving answers to a series of questions, including answers to machine type, recoating device, material type and data file units;

means for automatically determining a group of styles to be used in forming the object based on the answers provided, the styles including build styles and support styles;

means for forming a layer of material, according to a style forming part of the group, adjacent to any last formed layer of a material in preparation for forming a subsequent lamina of the object;

means for selectively applying prescribed stimulation to the layer, according to the object data and a style forming part of the group, to form a successive lamina of the object; and means for repeating the acts of forming and for selectively applying prescribed stimulation in order to form the object from a plurality of adhered laminae.

20. A stereolithographic method of forming a three-dimensional object from a plurality of adhered laminae by exposing successive layers of a material to stimulation, comprising:

providing data representing an object to be formed;

providing responses to a series of prompts, including responses to machine type, recoating device, material type and data file units;

at least in part automatically determining a group of styles to be used in forming the object, wherein the determination is derived based on the responses provided, the styles including build styles and support styles;

forming a layer of material according to at least one of the styles of the group, wherein the layer is formed in preparation for forming a successive lamina of the object;

exposing the material to the stimulation to form a successive lamina of the object, wherein the exposure is performed according to at least one of the styles of the group; and repeating the acts of forming and exposing a plurality of times in order to form the object from a plurality of laminae.

21. The method of claim 20 wherein the prompts are questions and the responses are answers.

22. Forming at least one lamina according to at least one style, comprising:

providing data representing a lamina to be formed;

providing a response to at least one prompt;

at least in part automatically determining the at least one style to be used in forming the lamina; and forming the at least one lamina.

23. The method of claim 22 wherein the at least one prompt is a question and the response is an answer.

* * * * *

UNITED STATES PATENT AND TRADEMARK OFFICE
CERTIFICATE OF CORRECTION

PATENT NO. : 6,159,411
DATED : December 12, 2000
INVENTOR(S) : Kulkarni et al.

It is certified that error appears in the above-identified patent and that said Letters Patent is hereby corrected as shown below:

<u>Column 8,</u>
Lines 36-37, "FIG. 2a-2e depict the StyleWizardin.ini file for practicing a preferred embodiment of the invention." should read -- FIGS. 2a-2e depict the potential stereolithographic machine models, build sytles, geometric features, lamina layer thicknesses, resins, and stereolithographic machine model candidate build style files. --.
Lines 38-39, "FIG. 3 is a flow chart depicting a preferred embodiment of the invention." should read -- FIG. 3 is a flow chart depicting a way of selecting the correct build styles according to the present invention. --
Lines 40-41, "FIG. 4 is a flow chart depicting a preferred embodiment of the invention." should read -- FIG. 4 depicts a flow chart for practicing a first preferred embodiment of the invention. --.

Signed and Sealed this

Fourth Day of December, 2001

*Attest:*

Nicholas P. Godici

NICHOLAS P. GODICI
*Attesting Officer*  *Acting Director of the United States Patent and Trademark Office*